United States Patent [19]
Squires

[11] 4,004,897
[45] Jan. 25, 1977

[54] FILTERING DUSTY GAS IN IMPROVED PANEL BED

[76] Inventor: Arthur M. Squires, 245 W. 104 St., New York, N.Y. 10025

[22] Filed: Aug. 28, 1974

[21] Appl. No.: 501,278

[52] U.S. Cl. .................................. 55/96; 55/98; 55/282; 55/350; 55/479; 55/487
[51] Int. Cl.² .................................. B01D 46/04
[58] Field of Search ............... 55/96, 98, 282, 350, 55/474, 479, 487, 512–519

[56] References Cited
UNITED STATES PATENTS

| 3,296,775 | 1/1967 | Squires | 55/96 |
| 3,912,466 | 10/1975 | Zenz | 55/96 |

FOREIGN PATENTS OR APPLICATIONS

| 216,675 | 6/1924 | United Kingdom | 55/474 |

Primary Examiner—Bernard Nozick

[57] ABSTRACT

There is provided an improved panel bed of granular material useful for filtering dust from a gas and especially suitable for construction in tall panels of high gas-treating capacity. Free surfaces for entry of gas are supported cooperatively by "chevron louvers" each having an upper and a lower surface, articulated at an edge joint within the panel bed. The upper surface has an outer edge that supports the outer edge of a given free surface, and the lower surface has an outer edge contiguous with the inner edge of the next subjacent free surface. Cleaning is by puffback to remove dust accumulated on the gas entry surfaces during filtration along with a portion of the granular material. A line drawn through the outer edge of the lower surface of a louver and the edge joint of the next subjacent louver forms an angle of less than about 60° to the horizontal, preventing dust that has penetrated into the panel bed from being dragged downward within the bed during the puffback cleaning.

3 Claims, 17 Drawing Figures

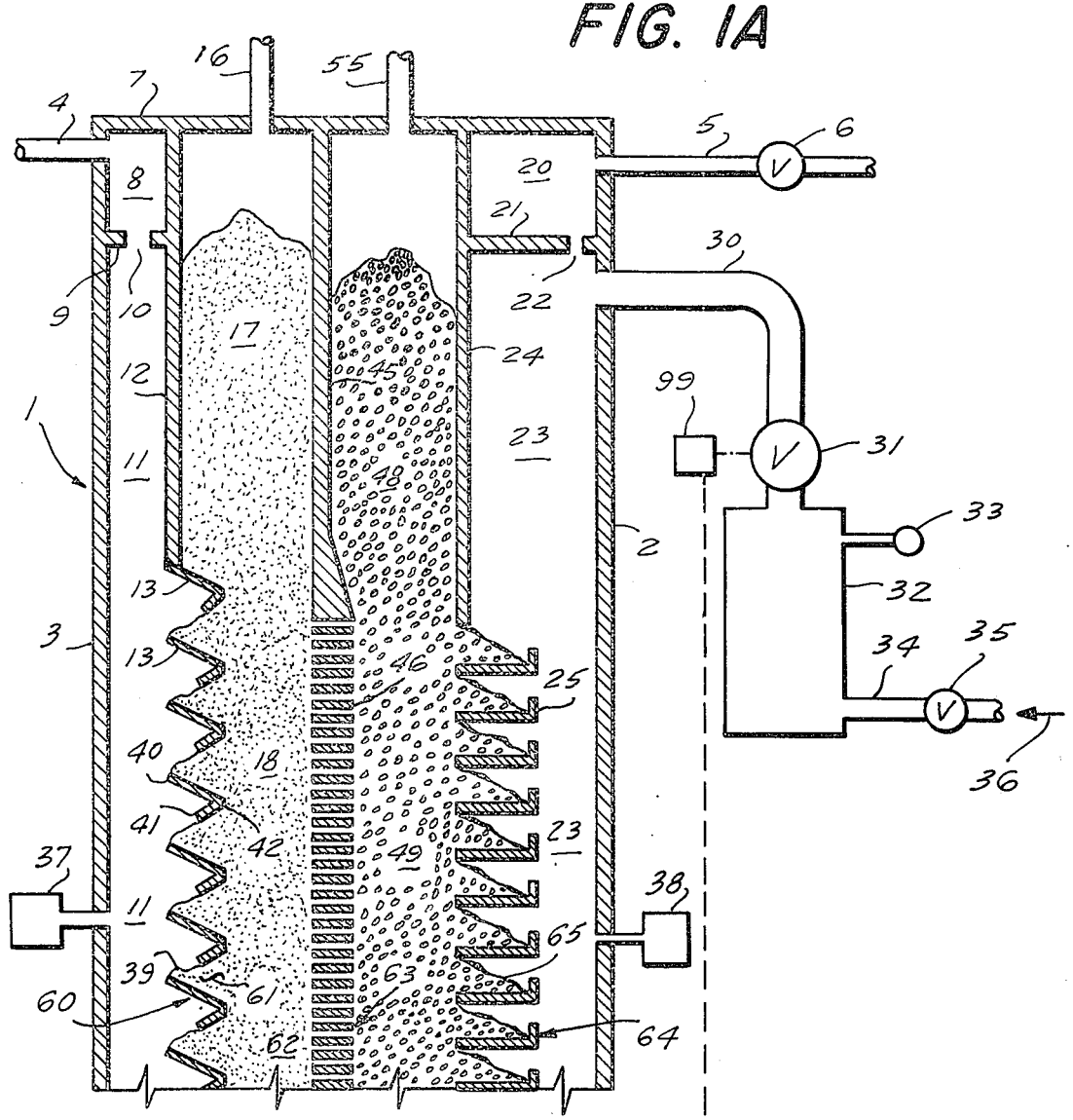
FIG. IA
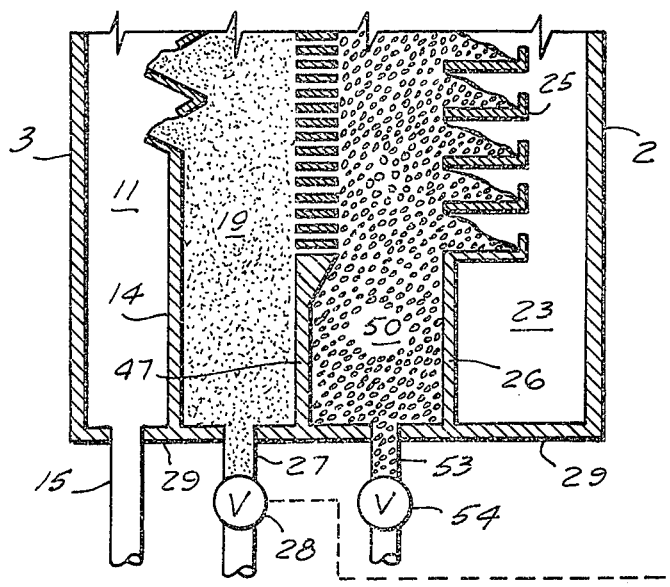
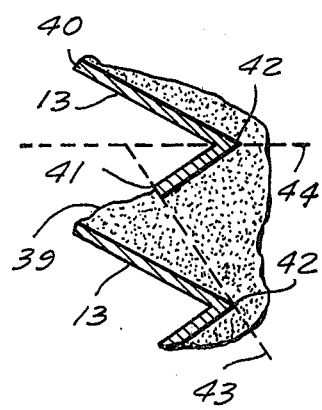
FIG. IB

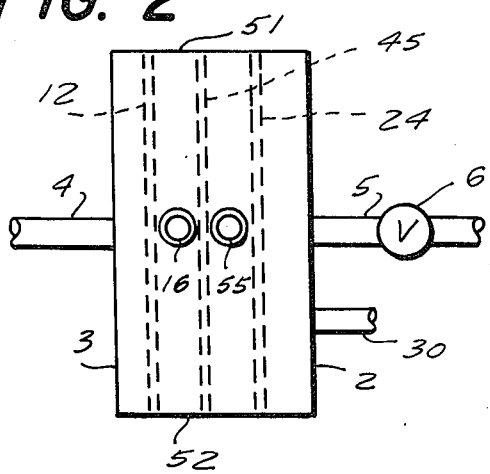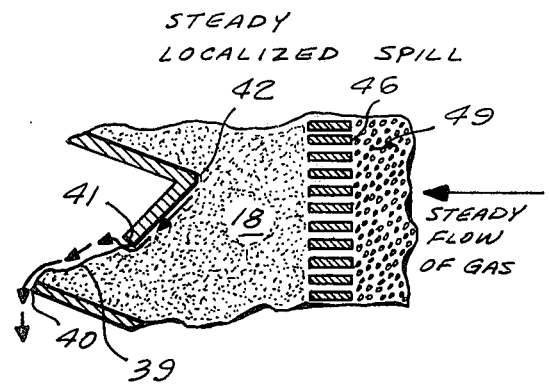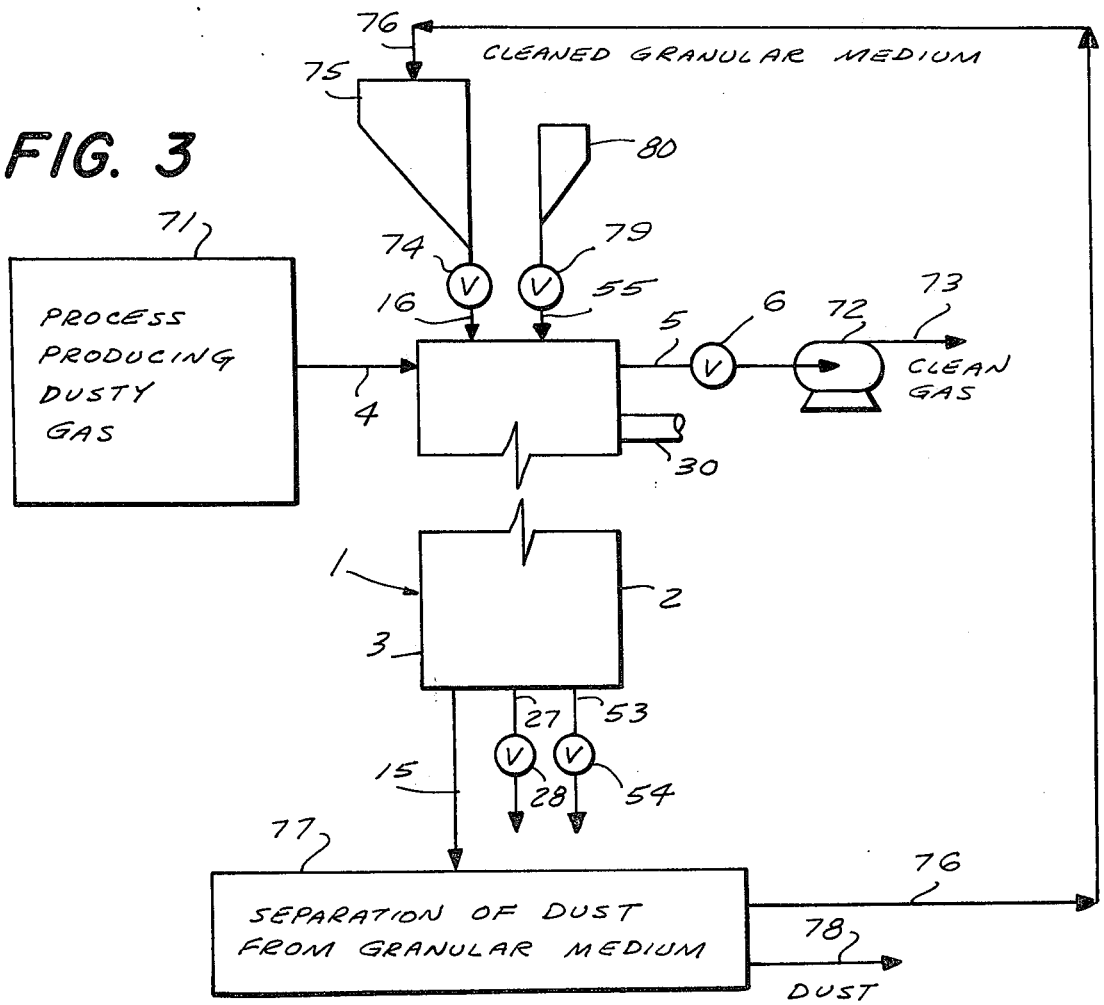

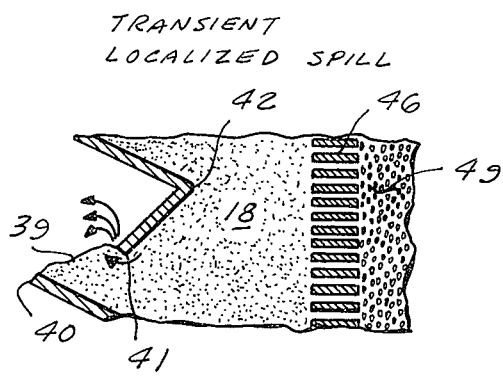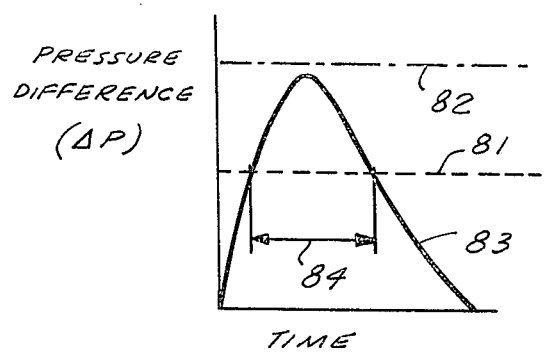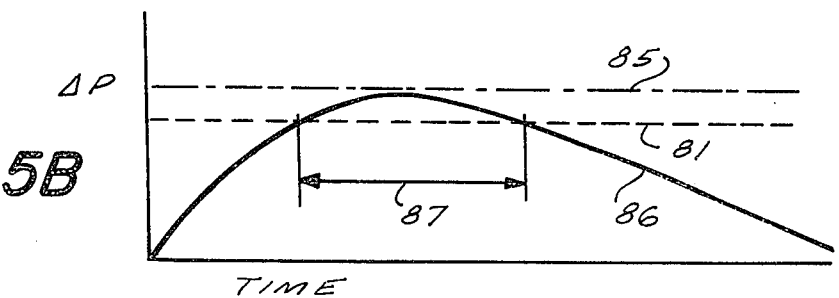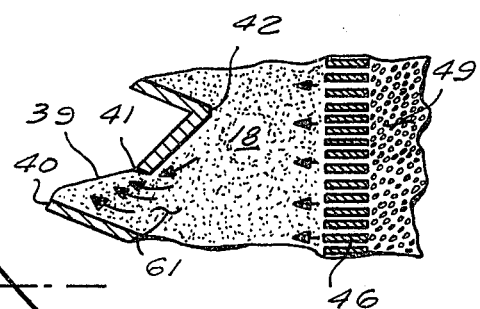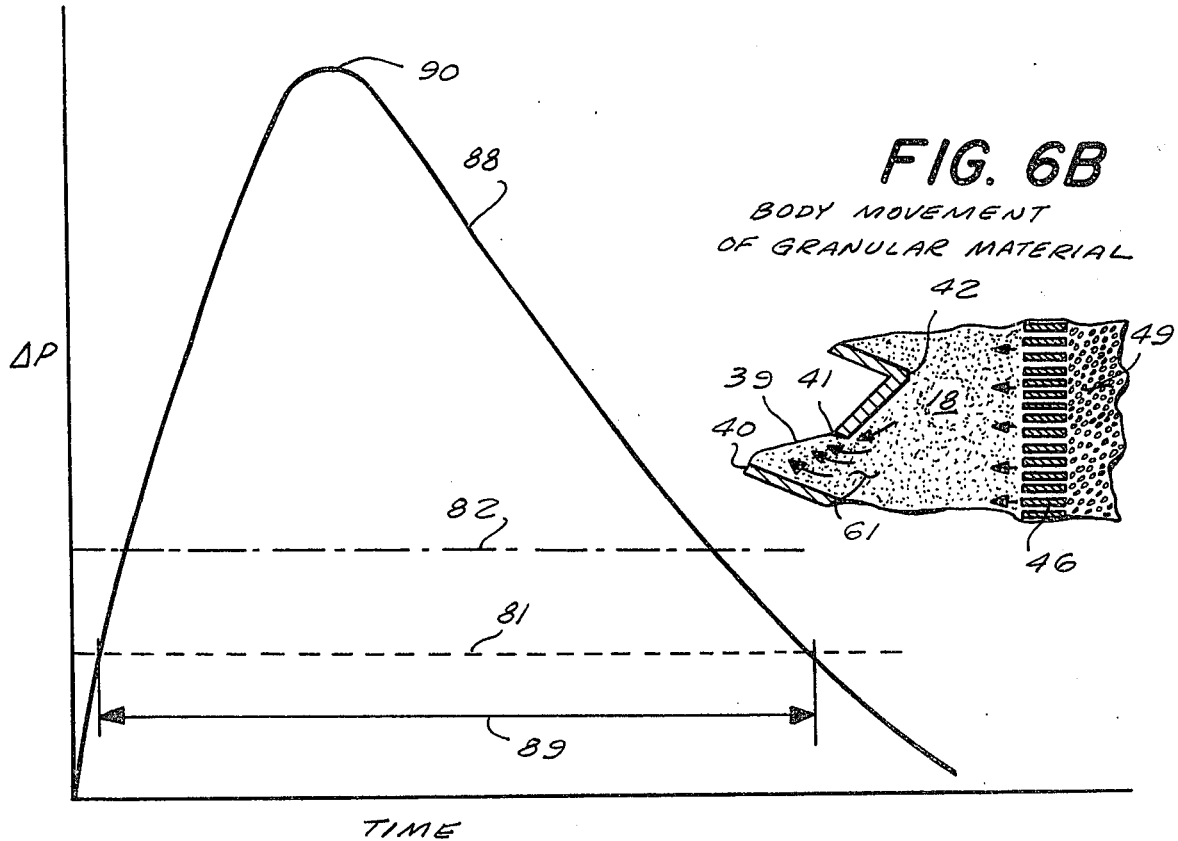

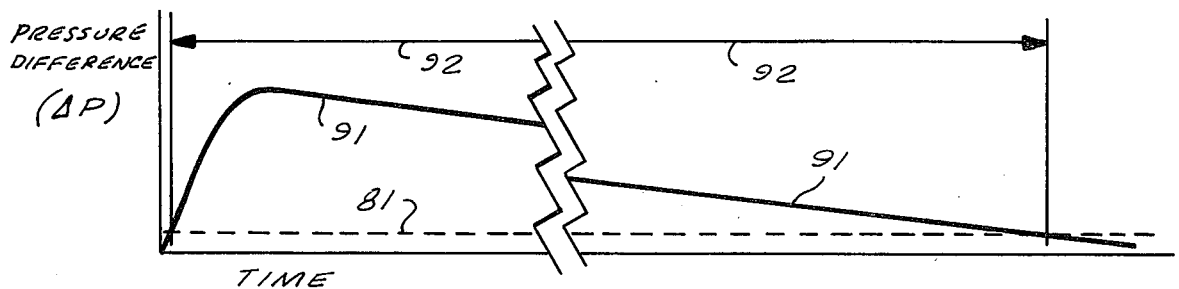
FIG. 7A
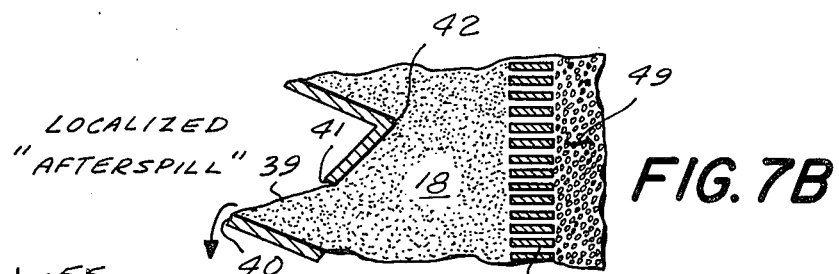
FIG. 7B
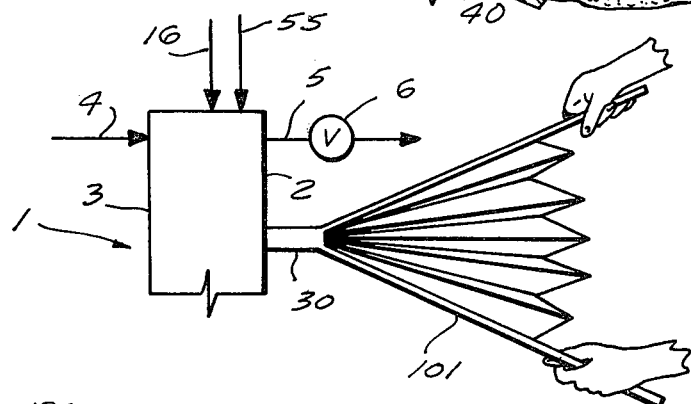
FIG. 8
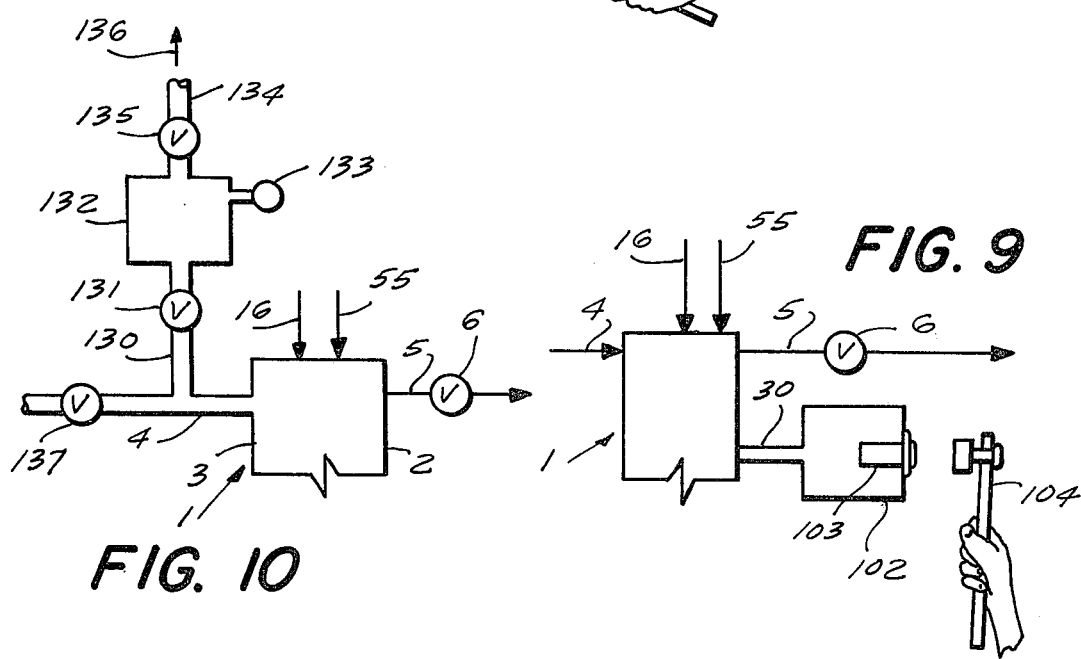
FIG. 9
FIG. 10

FILTERING DUSTY GAS IN IMPROVED PANEL BED

CROSS-REFERENCE TO RELATED APPLICATIONS

This application is related to my co-pending applications, filed simultaneously herewith, numbered and entitled as follows:
1. Treating Gas and Granular Material in Panel Bed, Ser. No. 501,276;
3. Countercurrent Contacting of Gas and Granular Material in Panel Bed, Ser. No. 501,277;
4. Treating Gas and Fine Granular Material in Panel Bed, Ser. No. 501,275.

The instant application is the second of this sequence.

Field of the Invention

The invention relates to the filtering of dust from a gas by a bed of granular material.

Description of the Prior Art

My aforementioned co-pending application number 1, "Treating Gas and Granular Material in Panel Bed", furnishes a review of prior art relating to panel beds, with emphasis upon art relating to techniques for removing "spent" granular material, together with filtered dust if any is present, from fluid entry surfaces of such panels. I incorporate this review in the instant application by reference.

My earlier U.S. Pat. No. 3,296,75 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas to produce a movement of granular material in mass (a "body movement") toward the gas entry faces of a panel bed.

General Description of the Invention

The aforementioned reverse transient flow specified in my aforementioned co-pending application number 1, producing body movement of granular medium and spilling medium from gas entry surfaces of a panel bed, is followed by a general downward motion of medium in the panel to make good losses of medium from the lower path of the panel. The downward motion is greatest at the uppermost elevation in the panel bed. In tests of the filtration of fly ash by a panel bed using slat-like louvers inclined at 60° from the horizontal and arranged to resemble a venetian blind, I noticed that fly ash that had penetrated into the bed near the inner edge of a gas entry surface in the upper part of the panel bed was often dragged downward within and further into the bed by the general downward motion. This undesirable penetration is more pronounced in a tall panel bed of high gas-filtering capacity.

I have discovered that this undesirable penetration of fly ash into a panel bed can be substantially prevented by use of a new design for the louvers that support the panel bed and retain the gas entry surfaces.

Objects of the Invention

An object of the invention is to provide an improved method and apparatus for the filtration of a gas containing particulate matter by a bed of a granular solid filtration medium.

Another object is to provide an improved louver for retention of gas filtration medium in a panel bed where a reverse transient flow of gas producing body movement of the medium is employed to periodically remove medium together with accumulated filtered dust from the gas entry face of the panel bed.

Another object is to provide an improved panel bed of exceptional height and gas-filtering capacity.

Another object is to provide a filter for gas at elevated temperature.

Summary of the Method Features of the Invention

My invention relates to an improved method of filtering gas by granular material to remove particulate matter. Granular material is arranged in a bed having a plurality of transversely disposed, upwardly spaced, gas entry portions separated by interposed supporting members. Substantially each member has an upper and a lower surface each having outer and inner edges with respect to the filter bed. The upper and lower surfaces are articulated at an edge joint at their respective inner edges. The gas entry portions have gas entry faces that are substantially contiguous with the outer edges of the upper surfaces of the members. A line drawn through substantially each outer edge of a lower surface of a member and passing through the edge joint the next subjacent member forms an angle of less than about 60° from the horizontal, an angle smaller than the angle of the failure plane, as determined from soil mechanics tests, for most granular materials that might preferably be employed in the panel bed filter. The bed has gas exit portions spaced horizontally apart from the inner edge joint. Gas is caused to flow forwardly in a substantially continuing flow during its filtration through the gas entry portions of the granular material bed and outwardly from the gas exit portions to accumulate particulate matter on the gas entry faces. Thereafter, a transient flow of gas is caused to move in the direction in reverse to the aforementioned flow of gas. The transient reverse flow produces first a rise (at a given rate of rise) and subsequently a fall in the pressure difference between the gas exit portions and the gas entry portions. This difference should remain greater than a first critical minimum difference for a time interval of less than about 150 milliseconds, and preferably less than about 50 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material together with accumulated particulate matter from the bed. The second critical minimum pressure difference depends upon the rate of rise in the pressure difference, being larger the more rapid the rise.

The specified angle of 60° for the aforementioned line ensures that particulate matter filtered by gas entry faces in the upper part of the panel bed filter, and penetrating a short distance beyond the faces and into the body of the filter bed, is not dragged downward within the bed by the downward motion created by the spill of material from the lower part of the panel bed and the downward pull of gravity to make good the losses caused by the spill.

A support member in which the upper surface inclines upwardly and outwardly from the inner edge joint at an angle between about 15° and 30° from the horizontal, and in which the lower surface inclines downwardly and outwardly from this joint at an angle between about 25° and about 45° from the horizontal, gives exceptionally uniform spill of material from each gas entry face by the reverse transient flow cleaning technique. Such a member presents a gas entry face having roughly the same area relative to its respective height of the panel bed as a simple slat-like louver inclined at 60° from the horizontal and arranged with its companion louvers in an assembly resembling a venetian blind. I believe that the superior performance of the support member of the new design disclosed herein results from the fact that the granular material in the body movement produced by the specified reverse transient flow does not have to turn direction in such a sharp angle as it must do in its approach to the 60° louvers.

For convenience of reference, I sometimes use the term "reverse puff" or "puffback" for the specified reverse transient flow of gas. The term puffback denotes broadly my new cleaning technique, explicated more fully in my aforementioned co-pending application number 1, whereby a panel bed is rid of dust captured by filtration along with some of the granular filtration medium.

Summary of Apparatus Features of the Invention

My invention also relates to an improved gas filter with a pair of upwardly extending, horizontally spaced-apart, perforate retaining walls, with means for supplying a loose solid particulate material into the space between the walls. There is a plurality of particulate-material support members each adjacent a perforation of the first perforate wall. A typical member has two surfaces articulated at an edge joint substantially adjacent and below the member's respective perforation. The lower of the two surfaces is arranged to extend outwardly and downwardly from the edge joint and into an inlet compartment in communication with the first wall. The upper of the two surfaces is arranged to extend outwardly and upwardly from the edge joint and into the inlet compartment. A line drawn through the outer edge of substantially each lower surface and the edge joint of the next subjacent member forms an angle less than about 60° from the horizontal. The members cooperate to support and expose to the inlet compartment a plurality of free surfaces of the particulate material and to retain the material in the aforementioned space. A gas outlet compartment is in communication with the perforations of the second perforate wall. There is an inlet for admitting gas into the inlet compartment, and an outlet for removing gas from the outlet compartment. Means are provided for periodically effecting a body movement of the particulate material toward the inlet compartment of at least those portions of the particulate material including the free surfaces and which are retained on the supporting members. The body movement means comprises means for effecting a transient flow of gas from gas outlet compartment to gas inlet compartment that produces first a rise and subsequently a fall in the pressure difference between the gas outlet compartment and the gas inlet compartment, the pressure difference remaining greater than the aforementioned first critical minimum difference for less than about 150 milliseconds and preferably for less than about 50 milliseconds. The pressure difference also should peak to a top value beyond the aforementioned second critical minimum difference.

A preferred means for effecting the transient flow of gas is a source of gas under pressure and means for effecting a sudden discharge of gas from the pressure source into the outlet compartment, with volume control means for limiting the quantity of gas discharged.

Another preferred means, useful for a small installation and especially for such an installation in infrequent service, is a bellows fitted to discharge gas into the outlet compartment. Also suitable is a chamber connected to the outlet compartment and fitted with a blank cartridge mounted to discharge gas explosively into the chamber. For operation of the panel bed filter at an elevated pressure, it will somtimes be preferable to provide a chamber at lower pressure that can be placed quickly into communication with the inlet compartment.

BRIEF DESCRIPTION OF THE DRAWINGS

The invention will be more particularly described in conjunction with the following drawings wherein:

FIG. 1A is a vertical section view of a preferred filter panel, with a bed of sand; FIG. 1B is an enlarged detail of a preferred bed support member at the bed's gas inlet face;

FIG. 2 is a top view of the panel of FIG. 1;

FIG. 3 is a schematic diagram illustrating use of the invention to filter a dusty gas;

FIG. 4 illustrates the steady localized spill produced by a steady backflow of gas across the panel;

FIG. 5C illustrates the transient localized spill caused by a transient reverse flow of gas that produces a rise and fall in pressure difference typified by the curves seen in FIGS. 5A and 5B;

FIG. 6B shows the desired body movement of granular material, effected by puffback, i.e., a transient reverse flow of gas that produces the specified rise and fall in pressure difference, as typified by the curve seen in FIG. 6A;

FIG. 7B shows the undesirable localized "afterspill" that ensues when a transient reverse flow of gas produces a rise and fall in pressure difference such as that seen in FIG. 7A;

FIGS. 8, 9, and 10 show alternative arrangements for effecting puffback.

DESCRIPTION OF THE PREFERRED EMBODIMENTS

Figure 11:
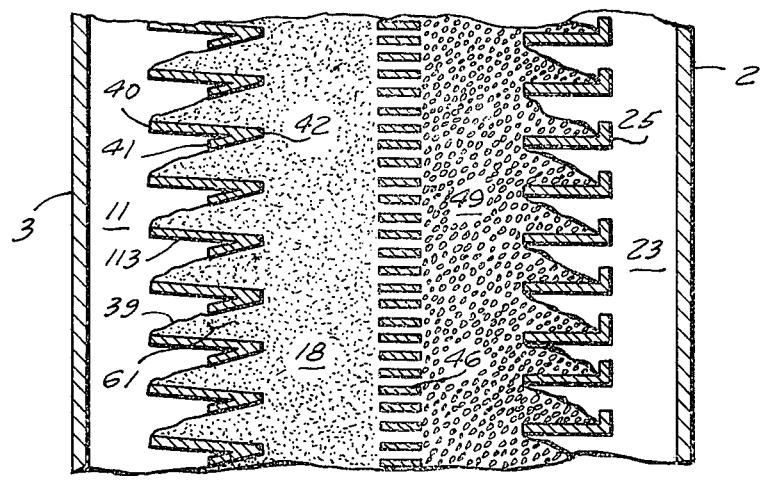
FIGS. 11 and 12 show alternative support members at the bed's gas entry face.

In the several figures, like reference numerals refer to like parts having like functions. In FIG. 1A the panel bed filter 1 comprises a casing of rectangular cross-section having opposed side walls 2 and 3 and top plate 7 bottom plate 29. Opposed edge walls 51 and 52 are to be seen in FIG. 2, a top view. A generally vertical bed of granular filter material 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular material, by means of pipe 27 and valve 28. Perforat wall 63 comprises a series of horizontal louvers or slats mounted one above another in a structure resembling subway grating and narrowly spaced apart in the vertical direction. Horizontally spaced-apart from wall 63 is perforate wall 64 comprising a series of generally horizontal louvers or slats 25 also mounted one above another. Granular material bed 49, comprising material considerably coarser in size than the material of bed 18, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be filtered is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) via plenum space 20 to pipe 5. Louvers 25 cooperate to support gas exit surfaces 65 of bed 49.

Perforate wall 60 comprises a series of members 13. A member 13 typically has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered as being formed between respective inner edge joints 42 of adjacent member 13. The members 13 are mounted in a manner such that they cooperate to support gas entry portions 61 of bed 18, viz., the angle of a line drawn through edge 41 of a given member and edge 40 of the next subjacent member should preferably be less than about 25° from the horizontal, an angles less than the angle of repose of most granular materials that might preferably be employed in bed 18. It will be seen that the gas entry portions 61 are transversely disposed, upwardly spaced, and separated by the interposed supporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal. FIG. 1B shows in enlarged detail two adjacent louvers 13; the angle to be less than about 60° is the angle between line 43 and line 44 in FIG. 1B.

Gas exit portions of bed 18 are seen at 62 in FIG. 1A, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

In operation of panel bed filter 1, the panel bed 1 is initially charged with granular material, such as quartz sand, from line 16, filling spaces 19, 18, and 17 as shown in FIG. 1A. Spaces 50, 49, and 48 are filled with a second, coarser granular material from line 55. Panel bed 1 is connected to a process 71 producing a dusty gas via gas-entry pipe 4, as shown in FIG. 3, and the gas is caused to flow forwardly through panel bed 1 by opening valve 6 in pipe 5. If process 71 does not supply gas at sufficient pressure to cause the gas to flow readily through panel bed 1, optional blower 72 is conveniently provided to carry gas from pipe 5 to line 73 for conducting clean gas from the system. Periodically, tank 32 is filled with gas at pressure from supply 36, valve 35 is closed, valve 6 is closed to interrupt the flow of gas being filtered, and valve 31 is opened quickly to produce the specified transient reverse flow from compartment 23 to compartment 11. Pipe 15 is provided to withdraw filter cake and granular filter mdium spilled from surfaces 39. As seen in FIG. 3, pipe 15 advantageously conducts the spilled solids to means 77 for separating dust and granular medium, for example, by screening or elutriating the dust away from the granular medium. Pipe 78 is provided for withdrawal of dust from means 77, and pipe 76, for return of granular medium to supply hopper 75, from which the medium may be returned to panel bed 1 via valve 74 and pipe 16. Supply hopper 80 may conveniently be provided to hold the aforementioned coarser granular material in readiness for supply to spaces 48, 49, and 50 via valve 79 and pipe 55. After a few seconds for dust to settle to the bottom of compartment 11, valve 31 is closed, and valve 6 is opened to resume filtration by the freshly cleaned bed 18.

Transducers 37 and 38 are conveniently provided in a test to determine the aforementioned first and second critical minimum pressure differences between space 23 and space 11, although competent fluid dynamicists will be able to calculate instantaneous pressure differences versus time in a test of puffback, given the porosity of beds 18 and 49, the size of valve 31, the speed of its opening, the size of tank 32, the pressure therein, the length and the diameter of line 30, and the dimensions of compartment 23.

Tests for determining the critical pressure differences and illustrating the suitable limits on the time interval during which the puffback maintains the reverse pressure difference greater than the first critical minimum difference are discussed more fully in my aforementioned co-pending application number 1, together with representative data, and this discussion is incorporated herein by reference. In brief, a time interval of about 150 milliseconds represents an approximate upper limit for acceptable performance, and I prefer a time interval below 100 milliseconds and preferably below 50 milliseconds for use of the panel bed 1 as a filter. At a time much longer than 150 milliseconds, the granular material movement took on much more of the character of the localized spill and less of the preferred body movement, and the distribution of the spill from gas entry surfaces 39 became poor, there being a much larger spill from the top surfaces than from the bottom. A practical minimum time interval for operation of the arrangement of FIG. 1A appears to be about 3 to 5 milliseconds, given the practical requirement that space 23 must be large enough to accommodate a flow of gas leaving wall 64. It should be noted, however, that one might, for example, achieve an extremely short time interval by mounting a large number of blank cartridges on wall 2 and firing them simultaneously to discharge gas explosively into space 23.

For convenient reference, FIG. 4 shows the steady localized spill of sand produced by a steady reverse flow of gas across bed 18. Sand spills from a narrow zone immediately adjacent to edge 41, and the spilled sand originates from sand just below the lower surface of the member 13 of which 41 is the lower edge. If a filter cake is present on surface 39, practically none of the filter cake will be found in the sand spill even after a prolonged spill of the type shown in the figure.

In an experiment with sized quartz sand of 20–30 mesh (U.S. Standard) in bed 18 and sand of 10–14 mesh in bed 49, I determined the first critical minimum pressure difference of the invention to be about 4.6 centimeters of water (cm). In a second arrangement (40–50 mesh sand in bed 18 and 10–14 mesh sand in bed 49), the first critical minimum difference was 3.3 cm. In a third arrangement (10–14 mesh sand in both bed 18 and bed 49), the first critical minimum difference was 5.3 cm.

FIG. 5C depicts the transient localized spill that results from a transient reverse flow of gas of intensity sufficient to produce a pressure difference surpassing the first critical minimum but not attaining the second, as shown in FIGS. 5A and 5B, where curves 83 and 86 give the instantaneous pressure difference ($\Delta P$), where line 81 is the first critical minimum $\Delta P$, and where line 82 is the second critical minimum $\Delta P$ observed for the rate of rise of curve 83 toward line 82, and where line 85 is the second critical minimum $\Delta P$ observed for the rate of rise of curve 86 to line 85. For each of the three aforementioned experimental arrangements, the second critical minimum $\Delta P$ was found to be about 8.2 cm for an about 5 millisecond time of rise to this $\Delta P$, and the second critical minimum $\Delta P$ was found to be about 5.7 cm for an about 10 millisecond time of rise to this $\Delta P$. According to my experiments, therefore, it would appear that the second critical minimum $\Delta P$ is relatively independent of the size of a quartz sand present in bed 18.

Body movement produced by the specified puffback is seen in FIG. 6B, viz., a puffback in which the reverse transient flow of gas produces a pressure difference curve 88 in FIG. 6A, which peaks at $\Delta P$ 90 well beyond second critical minimum $\Delta P$ 82. Time interval 89 is below about 150 milliseconds, and preferably below about 50 milliseconds.

For a pressure difference curve like curve 91 in FIG. 7A, where time interval 92 was several hundred milliseconds, I observed a persistent, prolonged afterspill of sand from edges 40 as depicted in FIG. 7B. Such an afterspill produces a useless loss of sand from bed 18, only causing performance of the bed as a filter to deteriorate, as discussed more fully in my aforementioned co-pending application number 1, the discussion being incorporated herein by reference.

The foregoing experiments were conducted with a panel bed in which the surface edge 40 and 42 of a typical member 13 was flat and was inclined at an angle of about 25° from the horizontal. The surface between edge 41 and 42 was also flat and was inclined at an angle of about 35° from the horizontal. Louvers 46 were 0.024 inches thick, ⅜ inch wide, and spaced apart vertically by a distance of 0.080 inches between adjacent louvers. At a "face velocity" of 31 feet per minute (the velocity of gas being filtered in the horizontal direction across perforate wall 60), filtration performance was observed in a long series of cycles filtering atmospheric air carrying redispersed fly ash from the combustion of pulverized coal at a loading of about 3.6 grams per cubic meter and using 20–30 mesh quartz sand in bed 18 and 10–14 mesh sand in bed 49. The percentage penetration of the fly ash was 0.33 in the first cycle, but as a result of the synergistic effect between the puffback cleaning technique and filtration performance, the penetrations declined to values typically between about 0.03 and about 0.06 in subsequent cycles. Each cycles between successive puffback cleanings was about 17 minutes in duration, and I conducted 42 cycles for about 700 minutes of operation. The initial pressure drop from space 11 to space 23 across the clean filter sand initially charged to the bed was about 2.5 cm. During the first 10 cycles or so, the pressure drop immediately after cleaning rose to about 3.3 cm, and at the end of the series the pressure drop just after cleaning was typically about 3.3 to about 3.8 cm. During filtration and as a result of increasing pressure drop as a filter cake accumulated, the pressure drop was allowed to increase to about 6.6 cm before application of puffback cleaning.

At the same face velocity and fly ash loading of about 4.3 grams per cubic meter and using 40–50 mesh quartz sand in bed 18 and 10–14 mesh sand in bed 49, I conducted a series of 95 cycles each of about 5.3 minutes duration to obtain outstandingly good filtration performance, viz., a penetration averaging about 0.03 per cent in cycles 1 through 5, and a penetration averaging about 0.007 percent in cycles 6 through 95 (affording a filtration efficiency of 99.993 percent). The average ratio of weight of ash recovered from the panel bed after a puffback cleaning to the weight of sand removed from the panel bed by the cleaning was about 0.2.

I have experimented with a number of types of panel beds in respect to the design of perforate wall 60, including a bed in which the surface between edge 40 and 42 of a typical member 13 was flat and was inclined at an angle of about 15° from the horizontal. The surface between edge 41 and 42 was also flat and was inclined at an angle of about 40° from the horizontal. I have also studied a bed in which the surface between edge 40 and 42 was strictly horizontal and the surface between 41 and 42 was steeply inclined to the horizontal. Although the latter arrangement gave satisfactory results, I prefer arrangements in which both surfaces are inclined at relatively shallow angles, although the surface between 41 and 42 is preferably the steeper of the two. It would appear from my experience that it is best if the sand undergoing the body movement of my specified puffback does not have to turn too sharply during the movement.

For convenient reference, I term support members 13 of the type seen in FIG. 1 chevron louvers. Tests have demonstrated that the chevron louver affords exceptionally uniform spill of sand from the several gas entry surfaces 39. It should be noted, however, that the porosity of sand bed 18 must be brought initially to the uniform porosity appropriate for the puffback intensity selected for operation, as discussed more fully in my co-pending application number 1, "Treating Gas and Granular Material in Panel Bed". Specifically, it is advantageous to subject the panel bed initially to a "strong" puffback at an intensity exceeding that contemplated for subsequent operations, or to discharge a controlled quantity of sand from the bottom of the panel bed.

I have conducted tests of a simple, flat, slat-like louver mounted at 60° from the horizontal in an arrangement resembling a venetian blind (for such an arrangement, see FIG. 1 of my aforementioned co-pending application number 1) in a test panel one foot in height, and visual observation shows clearly that a problem will arise in the operation of panels of much greater height, such as 10 feet, affording larger gas-filtering capacity. Fly ash that penetrates a short distance beyond the lower, inner edges of louvers near the top of the panel tends to be dragged downward by the general movement of sand downward to make good the loss of sand from the lower part of the panel. The new design for support member 13 disclosed herein obviates this difficulty, while maintaining the advantage of the foregoing preferred area relationship and providing a pathway for the body movement that does not require the sand to turn too sharply during the movement. With reference to FIG. 1B, a line drawn through edge joint 42 of the lower of the two members 13 shown in the figure and passing upward and outward (i.e., leftward in the figure) at the angle of the failure plane of the sand (generally about 65° to 70° from the horizontal line 44) will strike the surface of the upper of the two members 13 in the figure inwardly from edge 41 (i.e., to the right of 41). During the aforementioned general downward movement of the sand, only sand to the right of this line participates in the motion. Sand to the left of the line remains stationary, as well as any fly ash that has penetrated into this sand.

FIG. 8 shows how a bellows 101 can deliver a suitable reverse transient flow of gas to panel bed 1 via pipe 30. FIG. 9 shows how such a suitable flow can be delivered by attaching to pipe 30 a chamber 102 in which is mounted a blank cartridge 103 that may be fired by striking it with hammer 104.

FIG. 10 shows an alternative arrangement that may be preferred if the panel bed is used to treat gas at elevated pressure. Tank 132 is connected to line 4 via pipe 130 and quick-opening valve 131. The pressure of gas in tank 132 is reduced by connecting the tank to a receiver of gas at low pressure 136 via pipe 134 and valve 135. Pressure gauge 133 is provided to assist in adjusting the pressure in tank 132. Valve 135 is then closed, valve 137 in line 4 is closed, stopping the flow of gas to be treated in panel bed 1, and valve 131 is opened quickly to produce a transient flow of gas from line 5 to line 4 and thence into tank 132. Valve 131 is then closed, valve 137 opened, and a new treating cycle can begin.

Figure 12:
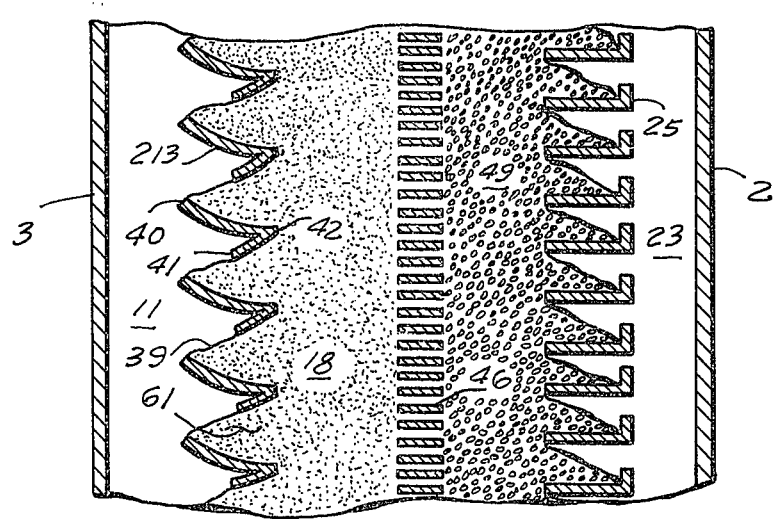

FIGS. 11 and 12 illustrate additional designs 113 and 213 for the support members of perforate wall 60 that may sometimes be preferred. Design 113 affords more gas entry surface area 39, allowing more filtered particulate matter to accumulate for a given rise in pressure drop across the panel bed between puffback cleanings. However, a problem is often experienced in starting up operation of a panel with such larger gas entry surface area, in that it is sometimes difficult to bring the bed 18 to a uniform porosity. As is elucidated more fully in my aforementioned co-pending application number 1, it is sometimes advantageous to discharge a controlled quantity of sand from the bottom of bed 18. Control means 99 may then conveniently be provided in FIG. 1 to open valve 28 for a short interval. Control means 99 may also conveniently govern the opening of valve 31, with valve 28 being scheduled to open and shut at appropriate intervals.

Design 213 of FIG. 12 illustrates that the upper and lower surfaces of the support member specified herein may sometimes advantageously be gently curved, preferably so that the curvature of each is concave upward.

In operation of the panel bed 1, it is preferable that valve 6 be opened slowly at the start of each filtration cycle, so that a sudden rush of gas into the bed 18 via surfaces 29 does not compact the bed and cause gaps to appear beneath the surfaces of members 13 extending from edges 41 to edge joints 42.

I do not wish my invention to be limited to the particular embodiments illustrated in the drawings and described above in detail. Other arrangements will be recognized by study of my aforementioned co-pending applications and by those skilled in the art, as well as purposes other than that discussed herein which the invention can advantageously serve.

Other granular filtration media besides sand may sometimes be preferred, especially media that confer an advantage by promoting some useful chemical reaction or physical effect upon the gas. For example, the gasification of coal in a fluidized bed is notorious for the large quantity of ultra-fine carbon particles present in the gas from the bed. These particles may advantageously be filtered upon a panel bed of larger carbon particles at the temperature of the fluidized bed with promotion of additional gasification reaction upon the larger carbon particles, as well as upon the accumulated filtered fine particles.

It will be recognized that each and every support member 13 of panel bed 1 need not conform to the design specified herein for a typical member. Top and bottom members, especially, may sometimes advantageously be atypical.

I claim:

1. The method of treating a gas involving the separation and removal of particulate material by means of a filter of granular material which comprises
    a. arranging the granular material in a bed having apertured outer walls having a plurality of transversely disposed upwardly spaced gas entry portions separated by interposed supporting members, each member having an upper and a lower surface, each of said upper and lower surfaces having outer and inner edges with respect to the filter bed, said surfaces being articulated at an edge joint at their respective inner edges, said gas entry portions having gas entry faces substantially contigous with said outer edges of said upper surfaces, a line being drawn through a said outer edge of a said lower surface and also through said inner edge joint of the next subjacent member forms an angle less than about 60° from the horizontal and said filter bed having gas exit portions spaced from said inner edge joints;
    b. forwardly flowing the gas for treatment in a substantially continuing flow through the gas entry portions of the granular material bed and outwardly from the gas exit portions to separate and accumulate particulate material at said gas entry faces;
    c. stopping the flow of said gas;
    d. causing a transient flow of gas to move in the direction in reverse to the flow of said gas in (b);

e. causing said transient reverse flow to produce first, a rise in the pressure difference at a given rate of rise between the gas exit portions and the gas entry portions and subsequently a fall in the pressure difference between the gas exit portions and the gas entry portions, said pressure difference remaining greater than a first critical minimum difference for a time interval of less than about 150 milliseconds, said first critical pressure difference being that at which a steady flow of gas in the reverse direction just produces a localized spill of granular material from the gas entry faces, and the pressure difference produced by said transient reverse flow peaking to a top value beyond a second critical minimum difference, which is the pressure difference at which a transient flow of gas in the reverse direction producing said pressure difference at said given rate of rise just initiates a body movement of the granular material supported by said members toward the gas entry faces to spill a portion of the granular material and accumulated particulate material from the bed; and f. supplying fresh granular material to said bed to replace material spilled from said gas entry portions.

2. The method of claim 1 in which said time interval is less than about 50 milliseconds.

3. The method of claim 1 in which the upper surface of substantially each said member is inclined upwardly from said inner edge joint at an angle between about 15° and about 30° from the horizontal and the lower surface is inclined downwardly from said inner edge joint at an angle between about 25° and about 45° from the horizontal.

* * * * *